(12) United States Patent
Lindeman

(10) Patent No.: US 11,534,278 B2
(45) Date of Patent: Dec. 27, 2022

(54) DENTURE DEBURR TOOL

(71) Applicant: Karen Ann Lindeman, Harvest, AL (US)

(72) Inventor: Karen Ann Lindeman, Harvest, AL (US)

( * ) Notice: Subject to any disclaimer, the term of this patent is extended or adjusted under 35 U.S.C. 154(b) by 644 days.

(21) Appl. No.: 16/150,230

(22) Filed: Oct. 2, 2018

(65) Prior Publication Data

US 2019/0099246 A1 Apr. 4, 2019

Related U.S. Application Data

(60) Provisional application No. 62/566,527, filed on Oct. 2, 2017.

(51) Int. Cl.
| | |
|---|---|
| *A61C 13/00* | (2006.01) |
| *A61C 17/32* | (2006.01) |
| *A61C 17/24* | (2006.01) |
| *A61C 3/06* | (2006.01) |

(52) U.S. Cl.
CPC ............ *A61C 13/0024* (2013.01); *A61C 3/06* (2013.01); *A61C 17/24* (2013.01); *A61C 17/32* (2013.01)

(58) Field of Classification Search
CPC .... B24B 9/00; B24B 9/20; B08B 1/00; A61C 13/34; A61C 3/02; A61C 3/025; A61C 3/06; A61C 17/24
USPC .... 433/141, 142, 147, 165, 166, 199.1, 171, 433/216, 51, 144; 51/328, 358
See application file for complete search history.

(56) References Cited

U.S. PATENT DOCUMENTS

| | | | | |
|---|---|---|---|---|
| 1,963,360 | A | * | 6/1934 | Gibbin ..................... A46B 5/00 15/167.1 |
| 2,119,986 | A | | 6/1938 | Dremel |
| 2,333,785 | A | * | 11/1943 | Harrison .............. B24D 11/003 51/293 |
| 2,623,003 | A | * | 12/1952 | Friedlob ................ A61Q 11/00 132/321 |
| 2,769,193 | A | * | 11/1956 | Jackson ............... A61C 17/036 206/83 |
| 2,880,081 | A | * | 3/1959 | Eubank .................. B24D 18/00 501/141 |

(Continued)

OTHER PUBLICATIONS https://www.homedepot.com/p/Dremel-Rotary-Tool-Accessory-Kit-for-Cutting-Sanding-Polishing-Grinding-and-Cleaning-162-Piece-712/202016454? Oct. 2, 2018, pp. 1-4, Home Depot, USA.

*Primary Examiner* — Edward Moran
*Assistant Examiner* — Matthew P Saunders
(74) *Attorney, Agent, or Firm* — William C West

(57) ABSTRACT

A deburr tool and processes to smooth spires on dentures after an adjustment by the dentist for a proper fit are presented. The deburr tool may have a deburr element comprised of soapstone or chalk, and the deburr element may have a variety of geometric shapes. For example, it may be spherically shaped, parabolic shaped, triangular shaped, cylindrical shaped with and an outer face between a one side and an other side, or rectangular shaped. Appling the one or more outer faces, surfaces, or edges of soapstone to the spires and using a rotary or reciprocating motion, the spires may be smoothed to provide a comfortable fit. The deburr element may have a holding element with a distal end and an other end connected to the deburr element and configured to use in an individuals hand or may be configured to insert in a rotary or reciprocating machine.

4 Claims, 7 Drawing Sheets

(56) References Cited

U.S. PATENT DOCUMENTS

| | | | | |
|---|---|---|---|---|
| 3,280,420 A * | 10/1966 | Wanzenberg | A47L 23/10 | |
| | | | 206/229 | |
| 3,287,861 A * | 11/1966 | Abernathy | B24D 18/00 | |
| | | | 451/540 | |
| 3,318,002 A * | 5/1967 | Klein | A61C 3/06 | |
| | | | 433/135 | |
| 3,613,143 A * | 10/1971 | Muhler | A46D 1/0238 | |
| | | | 15/207.2 | |
| 3,872,594 A * | 3/1975 | Gerteisen | A61C 3/06 | |
| | | | 433/166 | |
| 3,902,279 A * | 9/1975 | Lookadoo | B24B 47/00 | |
| | | | 451/178 | |
| 4,447,208 A * | 5/1984 | Kawai | B24D 13/14 | |
| | | | 433/166 | |
| 4,533,325 A * | 8/1985 | Blair | A61P 11/00 | |
| | | | 433/171 | |
| 5,033,238 A * | 7/1991 | Zubler | B08B 15/04 | |
| | | | 451/8 | |
| 5,180,303 A * | 1/1993 | Homburg | A61C 8/0048 | |
| | | | 433/173 | |
| 5,306,319 A * | 4/1994 | Krishnan | C08G 59/5026 | |
| | | | 51/293 | |
| 5,679,401 A * | 10/1997 | Bawden | A61C 7/00 | |
| | | | 433/25 | |
| 6,572,455 B1 * | 6/2003 | Christian | B24B 23/02 | |
| | | | 451/461 | |
| 6,676,410 B2 * | 1/2004 | Beppu | A61C 3/02 | |
| | | | 433/166 | |
| 6,726,546 B2 * | 4/2004 | Christian | B24B 9/20 | |
| | | | 451/342 | |
| 7,351,059 B2 * | 4/2008 | Rochat | A61C 3/025 | |
| | | | 433/88 | |
| 8,955,528 B1 * | 2/2015 | Escobar | A46B 5/0008 | |
| | | | 132/310 | |
| 2009/0042166 A1 * | 2/2009 | Craig | A61C 3/02 | |
| | | | 451/28 | |
| 2010/0196856 A1 * | 8/2010 | Mancino | A61C 13/0003 | |
| | | | 433/201.1 | |
| 2010/0330535 A1 * | 12/2010 | Adusimilli | A61C 17/16 | |
| | | | 433/199.1 | |
| 2011/0014584 A1 * | 1/2011 | Lesser | A61C 17/00 | |
| | | | 433/142 | |
| 2015/0297318 A1 * | 10/2015 | Wiand | A61C 3/02 | |
| | | | 427/2.29 | |
| 2016/0220459 A1 * | 8/2016 | Sokolov | A61K 8/29 | |

* cited by examiner

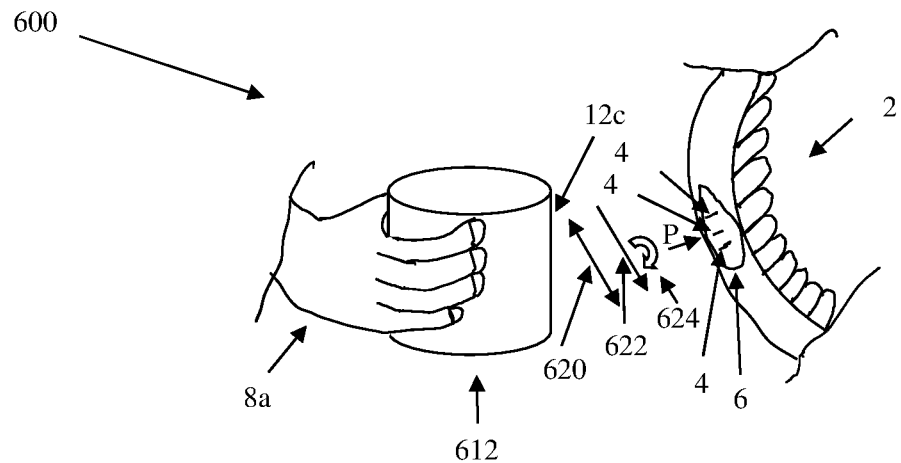
FIG. 16
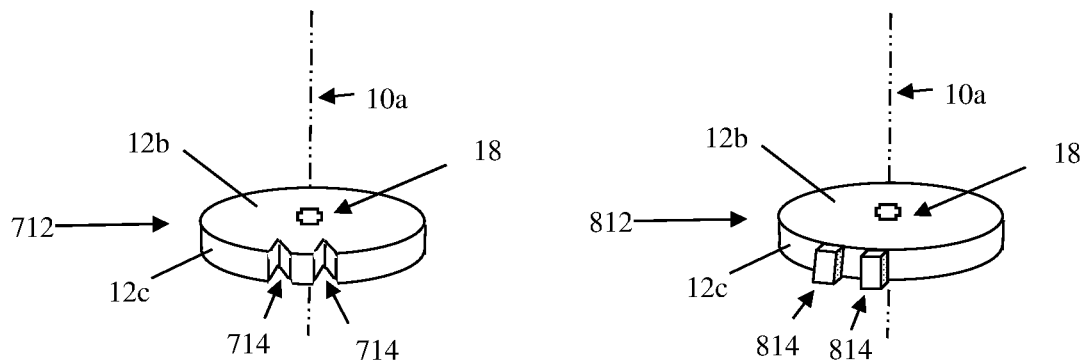
FIG. 17
FIG. 18
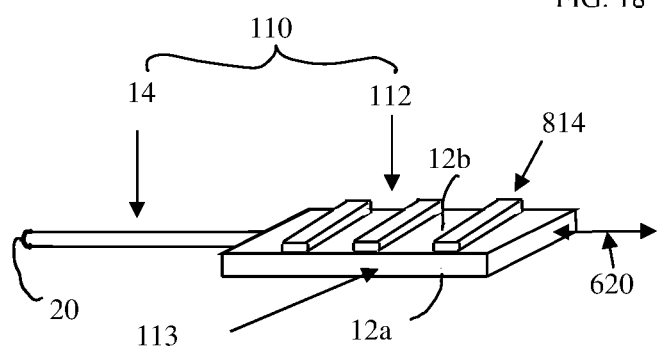
FIG. 19

DENTURE DEBURR TOOL

CROSS-REFERENCE TO RELATED APPLICATIONS

This application claims the benefit of U.S. Provisional Application No. 62/566,527, Denture Deburr Tool, filed Oct. 2, 2017 and incorporated herein.

FEDERALLY SPONSORED RESEARCH

Not applicable.

BACKGROUND OF THE INVENTION

The technical field of the invention relates to deburr tools, more specifically, to tools used in the dental profession to remove spires created on dentures after the dentist makes an adjustment to the dentures to provide a proper fit for the patient.

Dentists attempting to smooth spires from dentures created from adjusting the denture by removing material for a proper fit are often met with significant challenges. A problem currently exists with the flexible polymer dentures. When a dentist attempts to remove material from the denture in order to make it fit more comfortably, sometimes referred to as an adjustment, because of elasticity of the material tiny flexible spires are created creating an irritant in the patient's mouth.

Using what is commonly referred to as "soapstone", the spires can be smoothed in what is referred to as a deburr process. Soapstone is a naturally mined material used for writing on heat hardened steel which has a dark coarse texture to it, crafts, and most recently in the manufacture of countertops. It is a composite of mostly talc, and a number of other non-toxic minerals. The soapstone may be attached to a holding element and the soapstone placed against the denture and then moved relative to the denture in a deburr motion. The deburr motion may be in a spinning, circular or reciprocating pattern to smooth the spires, preventing the irritation associated with the spires, and allowing the dentures to fit more comfortably once reinserted in the patient's mouth. Wetting the denture as it is honed will reduce dust resulting from the deburr process. The patient and the dentist will both benefit in creating a tool that can easily be used to smooth the spires from dentures during the adjustment process. Thus, a method and a device to efficiently smooth the spires on the dentures are provided. The present invention provides a simple tool that may be used at a variety of angles and in a rotary (spinning) or reciprocating (back and forth) motion to smooth the spires or remove the spires (i.e., burrs) from the dentures. The tool or device may have a deburr element and a holding element. The deburr element may vary in size and shape and may be configured for the particular size, texture, and material composition of the dentures. Additionally, the holding element (i.e., mandrel) should not be limited to a particular material, geometric shape or length. For example, the holding element may be an elongated circular rod or may have numerous sides, such as a six sided elongated holding element, and the holding element may have a distal end with a variety of geometries such as a flat, hemispherical, or pointed distal end. Also, the deburr element may be of various geometric shapes (e.g., circular, rectangular, triangular, pentagonal, hexagonal, parabolic, and pentagonal) and thicknesses. The motion when applying the deburr element to the denture should not be limited to a spinning motions or reciprocating action about a tool axis, but may also include applications of the soapstone that achieve the same or others results. It should also be noted that chalk may be used as a substitute for soapstone.

SUMMARY OF THE INVENTION

The present invention is a deburr tool (denture deburr tool) that can easily be used in the dentist's office to smooth spires resulting from an adjustment that is made to provide a better fitting denture. The present invention will benefit both the denture wearer and dentist. The deburr tool will provide an effective tool to smooth burrs or spires on the dentures. The deburr tool may comprise a deburr element and a holding element. The deburr element may be of varying sizes and shapes and may be made of soapstone. Additionally, the holding element or mandrel may an elongated element of sufficient strength and size configured to hold the deburr element, and that should not be limited to a particular material or length. The deburr motion of the deburr element may be spinning or rotating, reciprocating, or any motion to smooth the spires without damaging the denture. Additionally, the deburr element may be circular or cylindrical, parabolic, or spherical when a rotary action is desired, but could also be of other geometric shapes, such a rectangular, triangular, pentagonal, hexagonal for the reciprocating motion.

BRIEF DESCRIPTION OF THE DRAWINGS

The accompanying drawings, which are incorporated in and form part of the specification, illustrate various examples of the present invention and, together with the detailed description, serve to explain the principles of the invention.

FIG. 16 shows view shows prospective view of the one embodiment of the present invention where the deburr element has a cross shaped slot and is configured for mounting on a cross shaped first portion of the holding element.

FIG. 17 shows view shows prospective view of a disc shaped deburr element having v-channels.

FIG. 18 shows view shows prospective view of a disc shaped deburr element having ribs.

FIG. 19 shows view shows prospective view of a rectangular deburr element having ribs.

DESCRIPTION OF THE INVENTION

Figure 1:
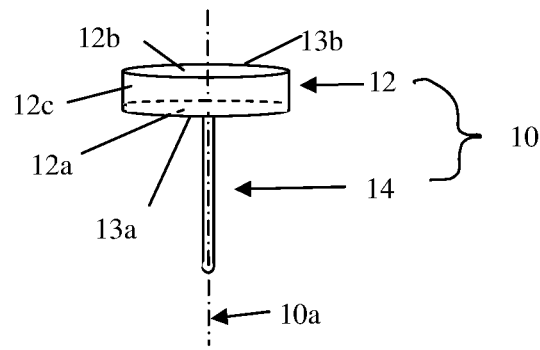
FIG. 1 shows prospective view of one embodiment of the present invention.

Referring to FIG. 1, the present invention is a deburr tool 10 for dentures that is used to remove (i.e., smooth) spires from the dentures after the dentures have been removed from a patient's mouth, and after the dentist has made an adjustment resulting in the spires having been formed on the dentures. Embodiments of the invention may comprise a business part, a deburr element, made of soapstone. Where soapstone is not available, chalk may be used. The business part, such as a deburr element 12 shown in FIG. 1A of one embodiment of the invention, may have three outer business surfaces. Continuing to refer to FIG. 1, the three outer business surfaces are one side 12a, other side 12b, and an outer face 12c. referring to FIGS. 1 and 2, the outer face 12c may intersect the one side to form a one side edge 13a and the other side 12b may intersect the outer face 12c to form an other side edge 13b. Where thickness T, the spacing between the one side 12a and the other side 12b, is very small the outer face 12c may be like an outer edge. Looking again to FIGS. 2 and 3, the deburr tool 10 may further comprise a holding element 14 inserted in a slot 18 of the deburr element 12.

Referring to FIGS. 1, 2, 3, and 4, the holding element 14 may be an elongated element of length L and holding element diameter HD, and the holding element 14 configured located on the tool axis 10a. The holding element 14 may have a distal end 20 and a other end 22 with the other end 22 configured to be inserted in the slot 18 of the deburr element. The slot 18 may be located on the tool axis 10a. The holding element 14 is used to hold the deburr element 12 while applying the deburr element against the dentures. The deburr tool 10 may move back and forth along the tool axis 10a or may rotate about the tool axis 10a.

Figure 2:
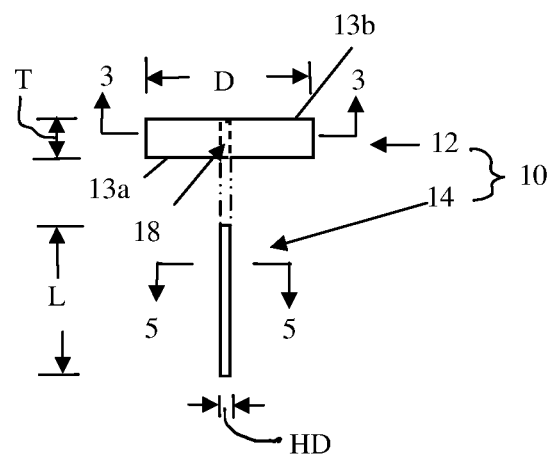
FIG. 2 shows an elevation view of the current invention
Figure 3:
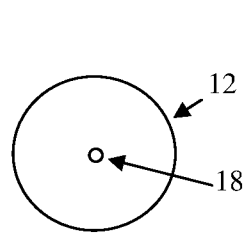
FIG. 3 show a sectional view along line 3-3 of FIG. 2.
Figure 4:
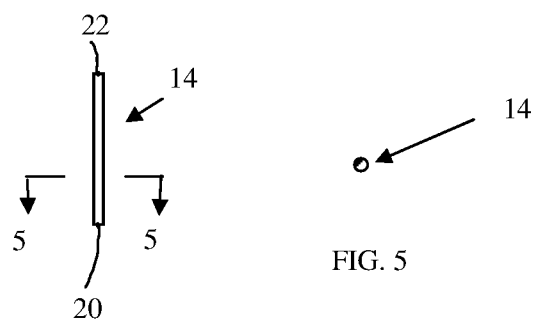
FIG. 4 shows an elevation view of the shows the holding element of the present invention.
Figure 5:
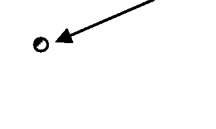
FIG. 5 shows a sectional view along line 5-5 of FIG. 2.

The holding element 14 may be comprised of round or rectangular rods of steel, aluminum, polymers, plastics, wood, or other appropriate materials, such as metal alloys, that are configured to hold the deburr element 14 during a particular deburr process. The holding element 14 may be attached to the deburr element 12 using a scored connection or other appropriate means, such as a threaded connection, screws, a press fit, or an adhesive, such glue. The deburr element 12 may be a circular, triangular, rectangular plate, or a spherical ball or some combination of geometric shape producing the desired deburr surfaces, such as outer face 12c, one side edge 13a and other side edge 13b. The size of the deburr element 14 and the holding element 14 will be dependent on the application. Referring to FIG. 2, the deburr element 12 may be cylindrically shaped like a disc having a diameter (D) of 12 mm to 25 mm and may have a thickness (T) between 2 mm to 4 mm. The holding element 14 may have a length (L) on one side 14a of the deburr element 12 of 35 mm to 50 mm. The deburr element 12 may be an elongated element with any of a variety of geometric cross sections. For example, the cross section may be shaped like a circle, a triangle, a rectangle, a pentagon, an octagon, etc.

Figure 6:
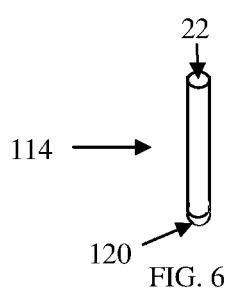
FIG. 6 shows prospective view of the holding element of the present invention with a hemispherical distal end.

Although the distal end 20 of the holding element 14 may be flat as shown in FIG. 2, the distal may also be of some other shape, such as the hemispherical as shown in FIG. 6.

Figure 7:
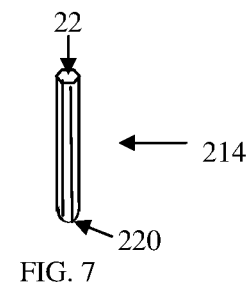
FIG. 7 shows view shows prospective of a six side holding element of the present invention.

Referring to FIG. 6 a hemispherical end holding element 114 that is cylindrical with a hemispherical distal end 120 is shown, or the holding element may be another geometric shape, and have multiple sides and distal ends, such as a six sided holding element 214 with a six sided distal end 220 is shown in FIG. 7.

Figure 8:
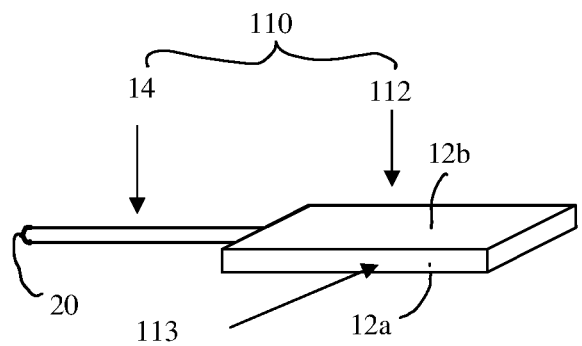
FIG. 8 shows elevation view of the yet another embodiment of the present invention that has a rectangular deburr element.

Referring to FIG. 8 an prospective view of another embodiment 110 of the invention having a rectangular deburr element 112 with a thinner central edge 113. The holding element 14 is the same as in the one embodiment 10.

Figure 9:
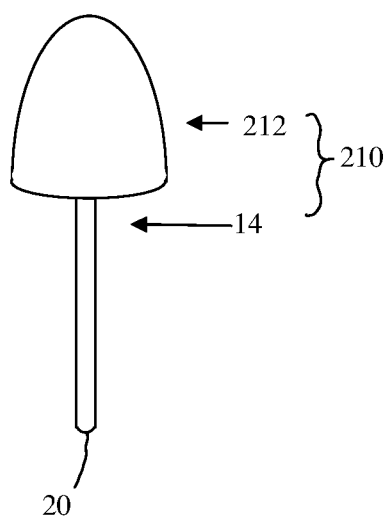
FIG. 9 shows elevation view of the yet another embodiment of the present invention with a bullet shaped business surface.

Referring again to FIG. 1, where two of the outer business surfaces (i.e., the other side 12b and the outer face 12c) come together without edges, such the other side edge 13b, yet another embodiment 210, a bullet shaped deburr element 212 is formed as shown in FIG. 9.

Figure 10:
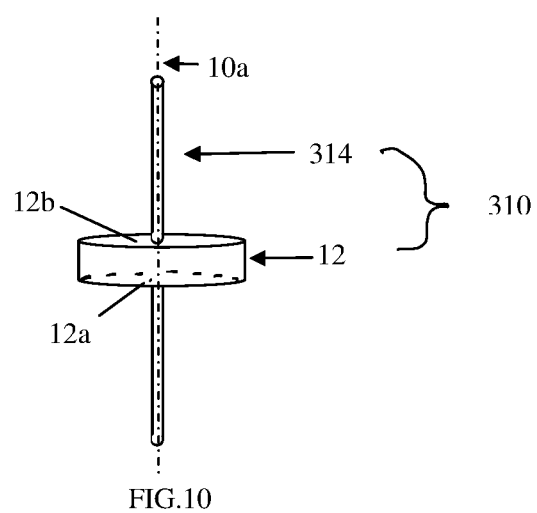
FIG. 10 shows prospective view of a holding element extending from each side of the deburr element holding element of the present invention.

Referring to FIG. 10, still yet another embodiment 310 of the invention is presented having the dual side holding element 314 extending from the one side 12a and the other side 12b of the deburr element 12. The deburr element 12 is the same as in the one embodiment 10.

Figure 11:
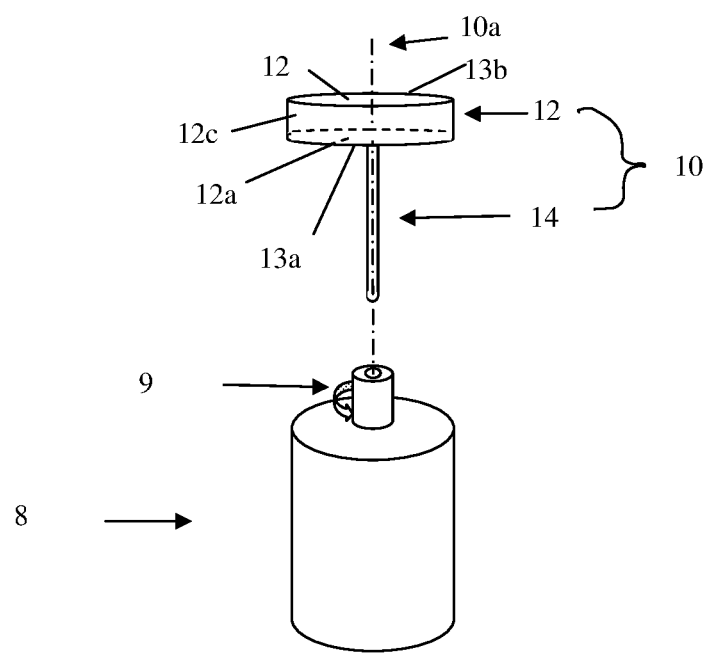
FIG. 11 shows view shows prospective view of the one embodiment of the present invention being aligned with a rotary machine.
Figure 12:
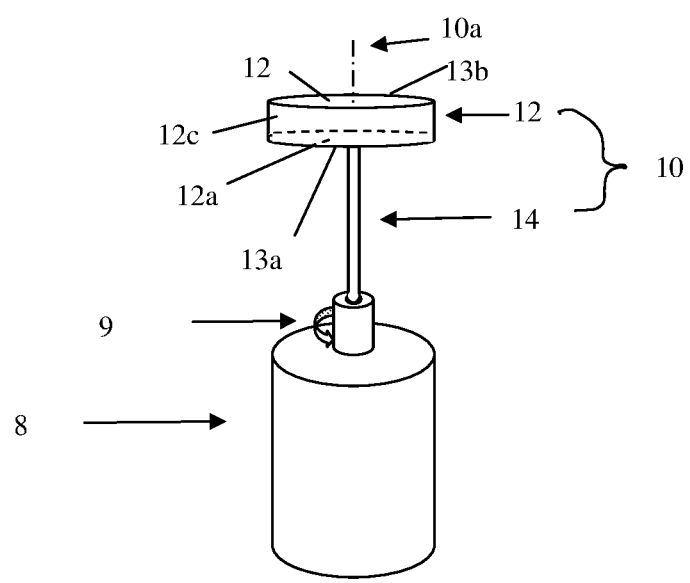
FIG. 12 shows view shows prospective view of the one embodiment of the present invention inserted in the rotary machine.
Figure 13:
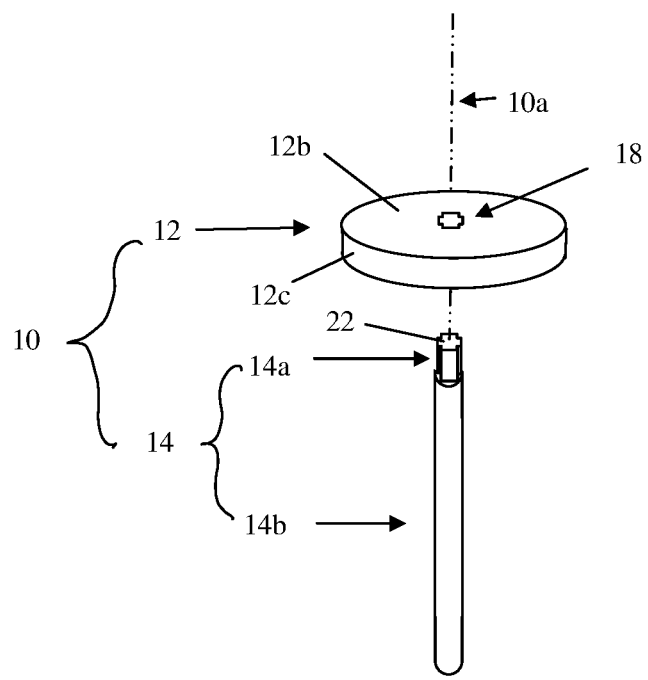
FIG. 13 shows view shows prospective view of the one embodiment of the present invention where the deburr element has a cross shaped slot and is configured for mounting on a cross shaped first portion of the holding element.

Referring to FIGS. 11 and 12, the deburr tool 10 may be inserted in a rotary machine 8 that may rotate the in a counter clockwise direction 9 or in a counter clockwise direction (not shown) about the tool axis 10a. Referring to FIG. 13 the holding element 14 may have a first portion 14a and a second portion 14b. The slot 18 of the deburr element 12 is configured to fit the first portion 14a of the holding element 14 and the first portion 14a of the holding suitable shaped, such as the cross shaped first portion of FIG. 13, to allow the rotary machine 8 to more easily rotate the deburr element 12.

Figure 14:
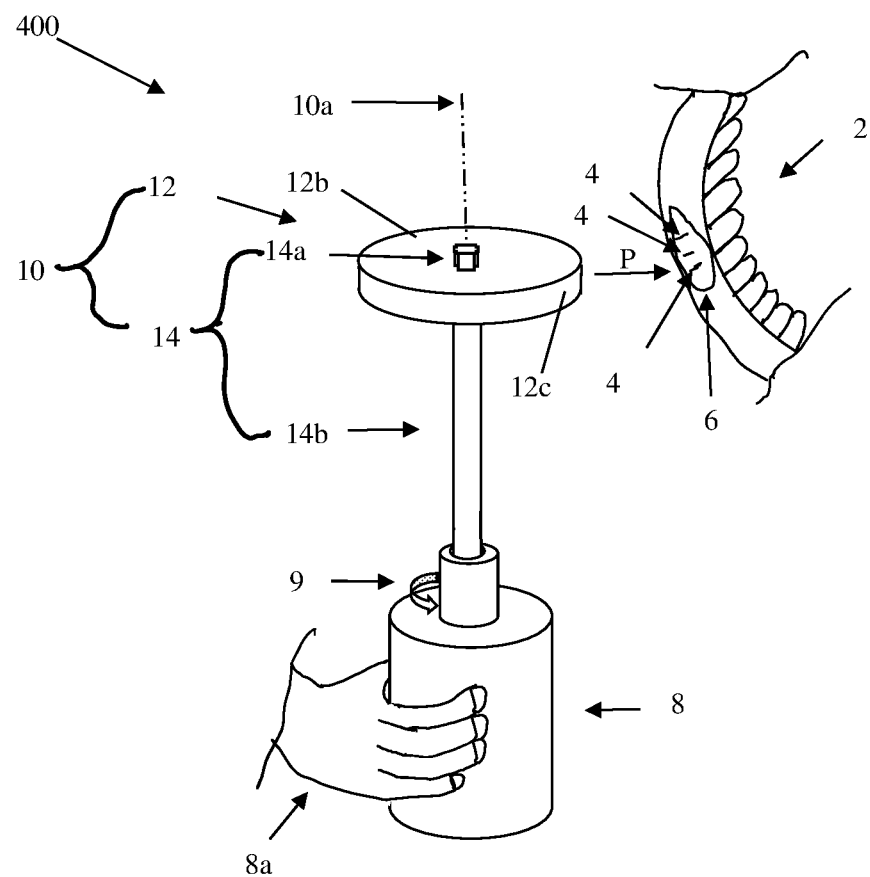
FIG. 14 shows view shows prospective view of the one embodiment of the present invention in a rotary machine performing a deburr process on a denture.

Dentists evaluate where any discomfort described by the patient who has recently received their new dentures is located. The denture is removed from the patient's mouth and using pre-existing methods an adjustment (removing an estimated amount of material from the dentures to create a more comfortable fit for the patient) is made. The denture is then examined under magnification, such as 5× magnification, to determine possible burr (spire) areas 6 where spires 4 from the adjustment remain as shown in FIG. 14. The spires 4 may be felt tactilely with the bare hand. They may also be smoothed or removed in a deburr process by using the deburr tool 10 and applying a light amount of pressure P, the pressure P may be between 0 and 1 psi, to the burr area 6 of the denture. These spires 4, if not smoothed or removed, will irritate the patient's mouth. The removed spires are particles (that is residue) from the deburr process. Continuing to refer to FIG. 14, using the deburr tool 10 installed in a rotary machine 8 per the machine manufacturer's instructions, a rotary deburr process 400 can be used to effectively remove the spires 4 from the denture. The rotary deburr process 400 using a device, such as the deburr tool 10 of the one embodiment of the invention, may include the following steps:

1. Moistening a denture 2 with water to prevent particles when using a deburr tool 10 from becoming airborne and being inhaled by the user of the deburr tool 10.

2. Installing the deburr tool 10 having a deburr element 12 of soapstone in a rotary machine 8.

3. Turn on the rotary machine 8.

4. Applying a light amount of pressure P to a burr area 6 of spires of the denture with an outer face 12c of the deburr element 12 contacting the burr area 6 with the outer face 12c of deburr element 12 contacting the spires 4 to smooth the spires 4.

5. Rinsing the denture to remove any residue.

6. Examining the denture 2 under magnification to ensure that none of the spires 4 remain.

7. Repeating steps 1 through 6 for the spires 4 that remain.

Note: The denture in step 4 must be thoroughly rinsed to remove the residue of particles.

Figure 15:
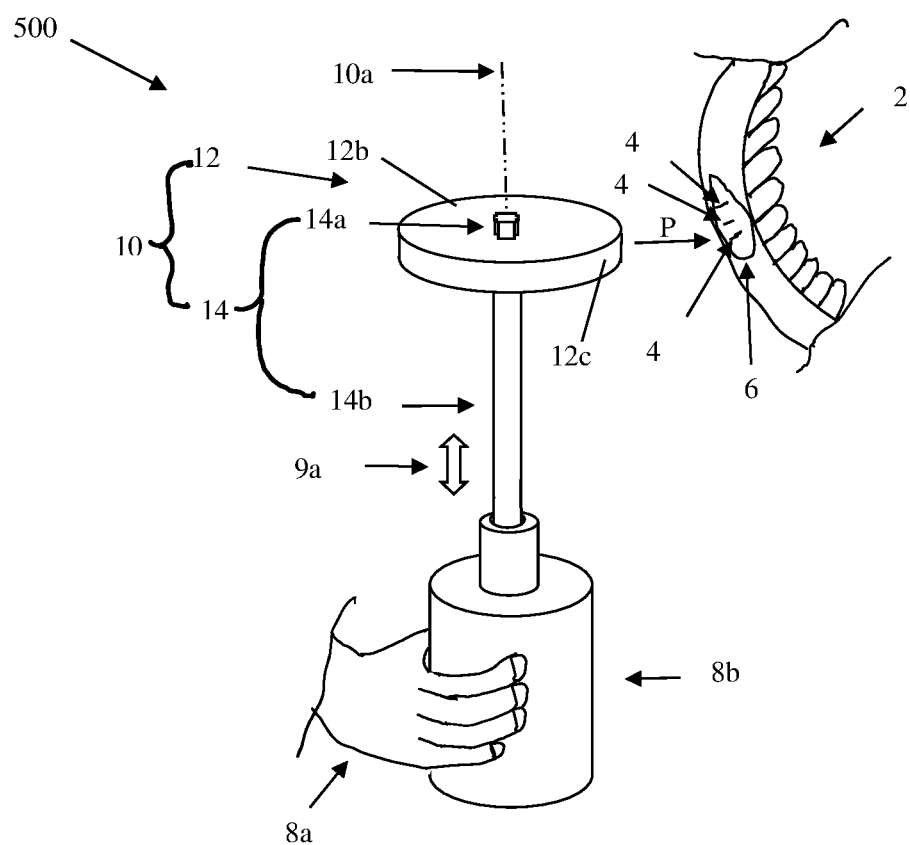
FIG. 15 shows view shows prospective view of the one embodiment of the present invention in a reciprocating machine performing a reciprocating deburr process on the denture.

Referring to FIG. 15, using the deburr tool 10 installed in a reciprocating machine 8b per the machine manufacturer's instructions, a reciprocating deburr process 500 can be used to effectively remove the spires 4 from the denture 2. The reciprocating deburr process 500 may use the deburr tool 10 of the one embodiment of the invention and the holding means moves back and forth along in a reciprocating direction 9a along the tool axis 10a. The reciprocating deburr process 500 has the same steps as the deburr process 400 and simply interchanges the reciprocating machine 8b for the rotary machine 8 of FIG. 14

Referring to FIG. 16, a natural deburr element 612 may be a piece of soapstone, or alternatively, chalk. The natural deburr element 612 may be placed in contact with the burr area 6 at the light pressure P and moved relative to the burr area 6 in a deburr motion, such as a back and forth motion 620 to smooth the spires 4. The term relative meaning that either the natural deburr element 612 or the denture 2 is fixed while the other is in motion. Although the deburr motion may be a back and forth motion 620, a in one direction motion 622 or a circular motion 624 such as that used to wipe a house window may also be used to smooth the spires 4. Referring to FIG. 16, a manual deburr process 600 is illustrated. The manual deburr process 600 using a deburr element to remove spires 4 from a burr area 6 of dentures 2 may have the following steps:

1. Moistening a denture 2 with water to prevent particles of residue when using a deburr tool 10 from becoming airborne and being inhaled by the user of the deburr tool 10.

2. Applying a light amount of pressure P with an outer face 12c of the deburr element, such as the natural deburr element 612, contacting the burr area 6 with the outer face 12c of the deburr element 12 contacting the spires 4 of the burr area 6.

3. Moving the deburr element, such as the natural deburr element 612, in as deburr motion, such as a back and forth motion 620, relative to the denture, to smooth the spires.

4. Rinsing the denture thoroughly to remove any residue.

5. Examining the denture 2 under magnification to ensure that none of the spires 4 remain.

6. Repeating at least steps 2 through 5 for the spires 4 that remain.

Referring to FIG. 17, channeled deburr element 712 that is a disc shaped is shown. It may be the deburr element 12 of FIGS. 13 and 14 configured with channels such as v-channels 714 cut into the outer face 12c. Referring to FIG. 18, a ribbed deburr element 812 is shown. It may be the deburr element 12 of FIG. 14 with raised spokes (ribs) 814 of soapstone or chalk. The channels, such as the v-channels 714 of FIG. 17, may be applied to other deburr elements, such as those in of FIGS. 8 and 9. Also, the spokes or ribs, such as the raised spokes (ribs) 814 of FIG. 18, may be applied to other geometric shaped deburr elements, such as the one in of FIG. 8. The channels, such as the v-channels 714 of FIG. 17, and the ribs, such as the raised spokes (ribs) 814 of FIG. 18, may be traverse to the direction of the deburr motion, such as the back and forth deburr motion 620, the one direction deburr motion 622, and the circular deburr motion 624 of FIG. 16. FIG. 19 shows the deburr element of FIG. 8 with raised spokes (ribs) 814 on the other side 12b of the another embodiment 110 of the current invention.

Although the invention has been described with reference to one or more particular embodiments, this description is not meant to be construed in a limiting sense. Various modifications of the disclosed embodiments as well as alternative embodiments of the invention will become apparent to persons skilled in the art. It is therefore contemplated that the appended claims will cover any such modification or embodiments that fall within the scope of the invention.

I claim:

1. A manual deburr process for a denture using a deburr tool having a deburr element consisting of soapstone to smooth spires from a burr area of the denture, the manual deburr process having steps:
   Step 1) Moistening the denture with water to prevent particles from becoming airborne;
   Step 2) Applying a light amount of pressure P to the burr area of the denture with one or more ribs of the deburr element of the deburr tool_contacting the spires of the burr area;
   Step 3) Moving the deburr element relative to the denture to smooth the spires; the one or more ribs traverse to the moving;
   Step 4) Rinsing the denture to remove any residue;
   Step 5) Examining the denture under magnification to ensure that none of the spires remain; and
   Step 6) Repeating at least steps 2 through 5 until the spires are smoothed.

2. A deburr process for a denture using a deburr tool having a deburr element consisting of soapstone to remove spires from a burr area of the denture, the deburr process having steps:
   Step 1) Moistening the denture with water to prevent particles when using the deburr tool from becoming airborne;
   Step 2) Applying a light amount of pressure P to a burr area with the deburr element contacting the spires;
   Step 3) Moving the deburr element relative to the denture to smooth the spires;
   Step 4) Rinsing the denture to remove any residue;
   Step 5) Examining the denture under magnification to ensure that none of the spires remain; and
   Step 6) Repeating at least steps 2 through 5 until the spires are smoothed.

3. A rotary deburr process to smooth spires from a denture having steps:
   Step 1) Moistening the denture with water to prevent particles when using a deburr tool from becoming airborne;
   Step 2) Installing the deburr tool having a deburr element consisting of soapstone in a rotary machine; the deburr element having one or more ribs on an outer face; the ribs running from one side to an other side along the outer face of the deburr element;
   Step 3) Turning the rotary machine on to rotate the deburr element;

Step 4) Applying a light amount of pressure P to a burr area of the denture with the deburr element contacting the burr area with the deburr element contacting the spires of the deburr area to smooth the spires;

Step 5) Rinsing the denture to remove any residue;

Step 6) Examining the denture under magnification to ensure that none of the spires remain; and Step 7) Repeating at least steps 3 through 6 for the spires that remain.

4. A reciprocating deburr process to smooth spires from a burr area of a denture, the reciprocating deburr process having steps:

Step 1) Moistening the denture with water to prevent particles when using a deburr tool from becoming airborne;

Step 2) Installing the deburr tool having a deburr element consisting of soapstone in a reciprocating machine;

Step 3) Turning the reciprocating machine on to move the deburr element back and forth along a tool axis;

Step 4) Applying a light amount of pressure P to the burr area of the denture with an outer face of the deburr element contacting the burr area with the outer face of the deburr element contacting the spires to smooth the spires;

Step 5) Rinsing the denture thoroughly to remove any residue;

Step 6) Examining the denture under magnification to ensure that none of the spires remain; and Step 7) Repeating at least steps 3 through 6 for the spires that remain.

\* \* \* \* \*